US 8,235,189 B2

(12) United States Patent
Maehara

(10) Patent No.: US 8,235,189 B2
(45) Date of Patent: Aug. 7, 2012

(54) DRUM BRAKE APPARATUS

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 1093 days.

(21) Appl. No.: 12/136,326

(22) Filed: Jun. 10, 2008

(65) Prior Publication Data

US 2008/0302620 A1    Dec. 11, 2008

(30) Foreign Application Priority Data

Jun. 11, 2007    (JP) .................................. 2007-153889
Oct. 3, 2007    (JP) .................................. 2007-260175

(51) Int. Cl.
*F16D 51/24*    (2006.01)
(52) U.S. Cl. ...................... 188/331; 188/364; 188/181 T
(58) Field of Classification Search .................. 188/325, 188/331, 332, 364, 181 T
See application file for complete search history.

(56) References Cited

U.S. PATENT DOCUMENTS

| 3,047,099 | A | * | 7/1962 | Dahle ............................ 188/331 |
| 4,286,504 | A | * | 9/1981 | Carre et al. ...................... 91/517 |
| 4,415,209 | A | * | 11/1983 | Schopper ..................... 303/9.73 |
| 4,449,757 | A | * | 5/1984 | Rath et al. .................... 303/9.72 |
| 4,503,954 | A | * | 3/1985 | Riquart et al. ................ 188/331 |
| 4,553,471 | A | * | 11/1985 | Brademeyer ..................... 91/173 |
| 4,615,419 | A | * | 10/1986 | Gaiser ........................ 188/181 T |
| 5,964,324 | A | * | 10/1999 | Maehara ........................ 188/325 |
| 6,186,294 | B1 | * | 2/2001 | Maehara ........................ 188/325 |
| 6,257,274 | B1 | * | 7/2001 | Maehara ........................ 137/504 |
| 6,290,036 | B1 | * | 9/2001 | Maehara ........................ 188/325 |

FOREIGN PATENT DOCUMENTS

| EP | 0 957 282 A2 | 11/1999 |
| JP | 54152757 A | 12/1979 |
| JP | 11-13791 | 1/1999 |
| JP | 11-22757 | 1/1999 |
| JP | 11-303904 | 11/1999 |
| JP | 11-325127 | 11/1999 |
| JP | 2000027900 A | 1/2000 |
| JP | 2000-329176 | 11/2000 |

OTHER PUBLICATIONS

Japanese Office Action (with English-language translation) dated Apr. 28, 2011.

* cited by examiner

*Primary Examiner* — Bradley King
*Assistant Examiner* — Thomas Irvin
(74) *Attorney, Agent, or Firm* — Drinker Biddle & Reath LLP

(57) ABSTRACT

A cylinder body 60 of a wheel cylinder assembly 6 for expanding a pair of brake shoes 3 and 4 by a pair of pistons 31 and 32 brought into contact with the respective brake shoes has a shape of a single straight pipe with both ends which are opened. The cylinder body 60 includes a first cylinder portion 35 for the one 32 of the pistons and a second cylinder portion 34 for the other 31 of the pistons. A valve seat 43 of a control valve 39 is arranged between the cylinder portions 34 and 35.

5 Claims, 6 Drawing Sheets

DRUM BRAKE APPARATUS

This application claims foreign priority from Japanese Patent Application Nos. 2007-153889 filed on Jun. 11, 2007, and 2007-260175 filed on Oct. 3, 2007, the entire contents of which are hereby incorporated by reference.

BACKGROUND OF THE INVENTION

1. Field of the Invention

The present invention relates to simplification and downsizing of a wheel cylinder in a duo-servo type drum brake apparatus mounted in a vehicle or the like.

2. Background Art

There are various types of drum brake apparatus used for braking a vehicle. The drum brake apparatus are classified to a leading trailing type, a two leading type, or a duo-servo type or the like, by an arrangement of brake shoes pressed to an inner peripheral face of a drum substantially in a cylindrical shape.

The duo-servo type drum brake apparatus generally includes a pair of brake shoes of a primary shoe and a secondary shoe arranged to be opposed to each other at an inside of the drum. According to the primary shoe, an inlet side of the drum in a positive rotational direction is made to constitute an inlet portion and an output side of the drum in the positive rotational direction is connected to an inlet side of the secondary shoe byway of an adjuster. Moreover, an outlet side of the secondary shoe is brought into contact with an anchor portion mounted onto a backing plate for receiving an anchor reaction force operated to the primary shoe and the secondary shoe by the anchor portion.

Thereby, when the primary shoe and the secondary shoe are expanded and pressed to the inner peripheral face of the drum, the anchor reaction force operated to the primary shoe is inputted to the input side of the secondary shoe to operate the secondary shoe to press to the drum inner peripheral face, and therefore, both of the primary shoe and the secondary shoe are operated as leading shoes and a brake force having a very high gain can be achieved.

The duo-servo type drum brake apparatus mentioned above is provided with a number of advantages of not only capable of achieving an extremely high brake force, easy to be downsized, and facilitated to be integrated to a parking brake in comparison with a drum brake apparatus of a leading trailing type or a two leading type. However, the duo-servo type is sensitive to a change in a friction coefficient of a lining of the brake shoe, and therefore, the brake force tends to be difficult to be stabilized and a device of stabilizing the brake force is requested.

The inventor has already proposed means for stabilizing a brake force, including a control lever for feeding back a control force in accordance with a control torque to one piston as a wheel cylinder assembly of expanding to open a pair of brake shoes by a pair of pistons in braking, and a control valve for closing a fluid path formed at inside of a cylinder body to restrain a further increase in the brake force when the brake torque exceeds a reference by utilizing the brake force of the brake lever (refer to, for example, Patent Reference 1, Patent Reference 2).

[Patent Reference 1] JP-A-2000-329176
[Patent Reference 2] JP-A-11-303904

Although the brake force can be realized to stabilize by the proposal, the wheel cylinder assembly of the background art forms exclusive cylinder portions for the respective pistons by shifting axial positions on the cylinder body (case of Patent Reference 1 mentioned above), or forms an exclusive liquid chamber for containing the control valve separately from the cylinder portion (case of Patent Reference 2 mentioned above), and therefore, the cylinder body is large-sized.

SUMMARY OF THE INVENTION

One or more embodiments of the invention provide a drum brake apparatus capable of achieving downsized formation and a reduction in work cost by simplifying a structure of a cylinder body in a wheel cylinder assembly including a control lever and a control valve as means for stabilizing a brake force.

In accordance with one or more embodiments of the invention, a drum brake apparatus is provided with a wheel cylinder assembly configured to expand a pair of brake shoes. The wheel cylinder assembly is provided with: a cylinder body; a pair of pistons brought into contact with the respective brake shoes to expand the brake shoes; a control lever configured to feed back a control force in accordance with a brake torque to one of the pistons; and a control valve configured to restrain an increase of the brake torque by closing a fluid path formed at inside of the cylinder body when the brake torque exceeds a reference. The cylinder body includes a structure having a shape of a single straight pipe with both ends which are opened, and the cylinder body includes a first cylinder portion for the one of the pistons on one end side of the both ends and a second cylinder portion for the other of the pistons on the other end side of the both ends. A valve seat of the control valve having the fluid path is arranged between the first cylinder portion and the second cylinder portion.

Further, in the drum brake apparatus, the valve seat may be restrained in position by a stop ring fixed to a groove portion of a cylinder inner periphery of the cylinder body; a valve body configured to seat on the valve seat by cooperatively moving with a returning movement of the one of pistons so as to close the fluid path may be mounted in a recess portion formed on the one of pistons.

Further, in the drum brake apparatus, the control valve may include a plug arranged oppositely to the valve seat, the valve seat and the plug are respectively restrained in position by stop rings fixed to groove portions of a cylinder inner periphery of the cylinder body, and a valve body configured to seat on the valve seat by cooperatively moving with a returning movement of the one of the pistons so as to close the fluid path may include a through hole communicated with the fluid path of the plug and is mounted in a recess portion formed at the plug.

Moreover, in the drum brake apparatus, wherein the valve body may be made of an elastic material, and the valve body may be elastically deformable when a press force from the one of the pistons is increased by increasing the brake torque after the valve body seats on the valve seat by cooperatively moving with a returning movement of the one of the pistons to close the fluid path.

Further, in the drum brake apparatus, the valve body may be held by the recess portion of the plug in liquid tight and slidably; and the valve body in the recess portion may be elastically supported to be able to displace in a direction of being remote from the valve seat by a valve holding spring for restricting the valve body from being displaced to a side of the valve seat and a return spring for urging the valve body to be brought into contact with the valve holding spring.

Moreover, in the drum brake apparatus, an end of a spring arranged between the valve seat and the plug to make the valve seat and the plug remote from each other may also be brought into contact with the valve body, and the spring may function as the valve holding spring of restricting the valve body from being displaced to the side of the valve seat.

Moreover, in the drum brake apparatus, at an end portion of the control lever pivotably disposed between an anchor pin and an end portion of one of the brake shoes, a curved face portion brought into contact with the end portion of the one of the brake shoes may include a curved face having a center of curvature at a position of being remote from a center of the anchor pin by a predetermined distance to a drum inner side such that a direction of a rotational moment is not changed by a change of an operating direction of an operating force from the brake shoe by the brake torque.

According to the drum brake apparatus described above, the cylinder body of the wheel cylinder assembly constitutes a cylinder portion in which the both ends of the cylinder structure in the shape of the single straight pipe respectively contain the pistons, in comparison with a case of the background art in which the exclusive cylinder portions are formed respectively for the pistons by shifting the axial positions, by simplifying the structure of the cylinder body, a reduction in cost can be realized by preventing large-sized formation of the cylinder body caused by shifting the axial positions of the respective cylinder portions and reducing steps of working the cylinder portions taking time and labor.

Further, a middle portion of the cylinder structure in the shape of the single straight pipe is utilized as the liquid chamber of containing the control valve, and therefore, in comparison with the case of the background art in which the exclusive liquid chamber of containing the control valve is formed separately from the cylinder portion, also in this respect, by simplifying the structure of the cylinder body, large-sized formation of the cylinder body caused by installing the liquid chamber for the control valve in parallel with the cylinder portion can be also resolved.

Therefore, small-sized formation and a reduction in work cost can be achieved by simplifying the structure of the cylinder body of the wheel cylinder assembly including the control lever and the control valve as means for stabilizing the brake force.

Other aspects and advantages of the invention will be apparent from the following description, the drawings and the claims.

DETAILED DESCRIPTION OF THE EXEMPLARY EMBODIMENTS

Exemplary embodiments of a drum brake apparatus according to the invention will be explained in details in reference to the drawings as follows.

Figure 1:
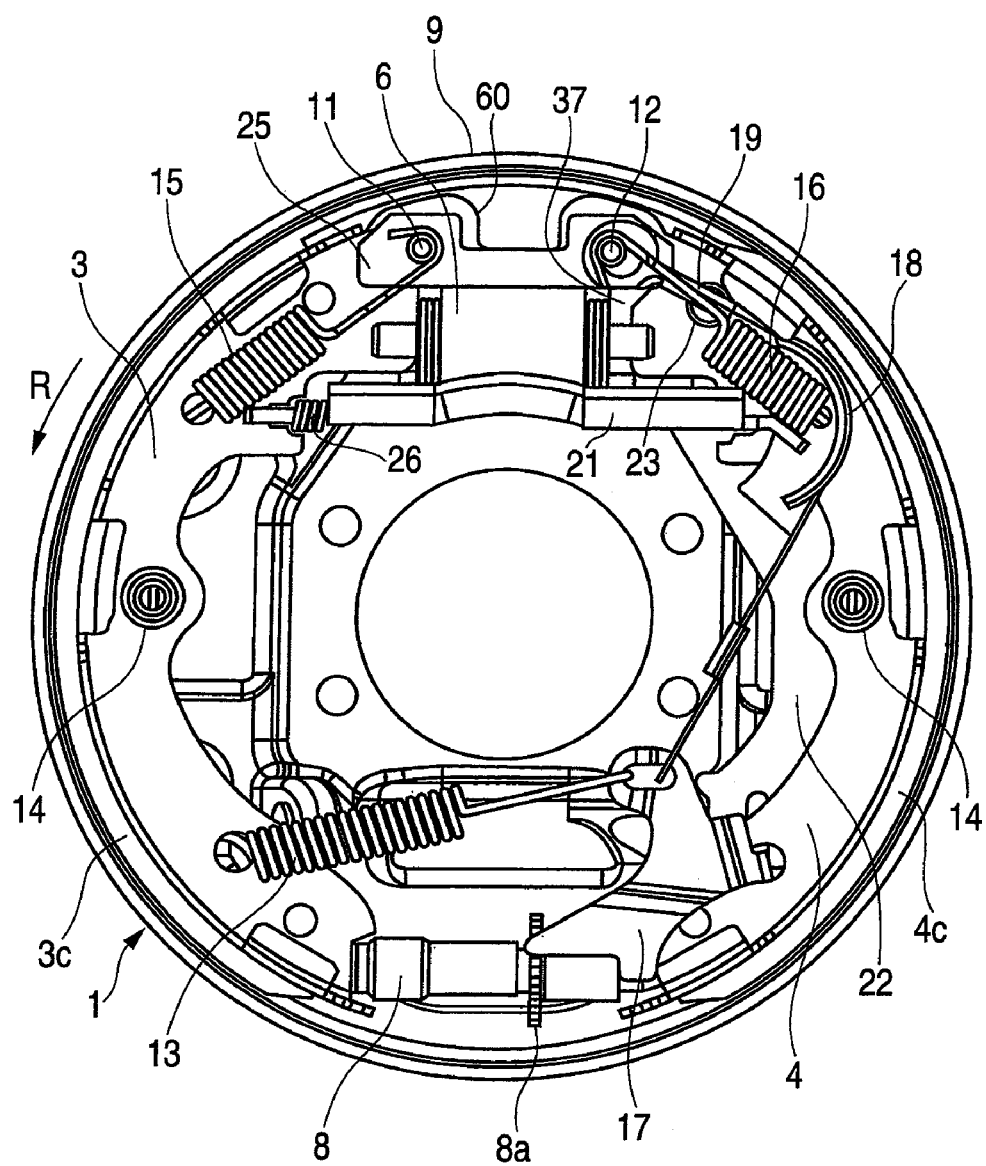
FIG. 1 is a front view of an embodiment (first exemplary embodiment) of a drum brake apparatus according to the invention.
Figure 2:
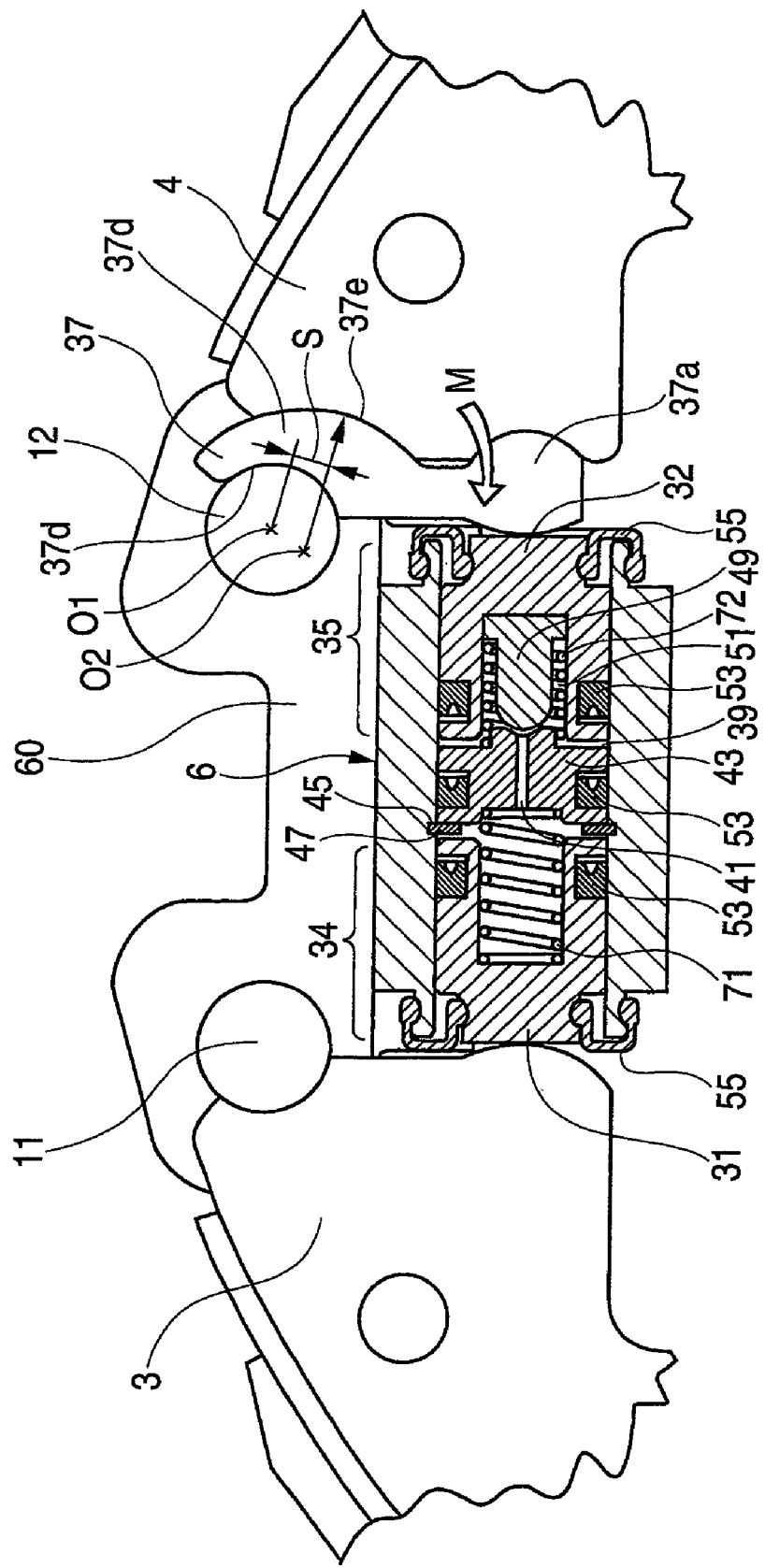
FIG. 2 is a vertical sectional view enlarging a wheel cylinder shown in FIG. 1.

FIG. 1 is a front view of an embodiment (first exemplary embodiment) of a drum brake apparatus according to the invention and FIG. 2 is a vertical sectional view enlarging a wheel cylinder shown in FIG. 1.

A drum brake apparatus 1 shown in FIG. 1 is a so-to-speak duo-servo type drum brake apparatus including a primary shoe 3 and a secondary shoe 4 opposedly arranged in a space at inside of a drum, not illustrated, substantially in a cylindrical shape, a wheel cylinder assembly 6 arranged on one of opposed end sides of the brake shoes 3 and 4 for pressing the brake shoes 3 and 4 to a drum face in braking, an adjuster assembly 8 arranged between other opposed ends of the respective brake shoes 3 and 4 and serving also as a link function for inputting an output of the primary shoe 3 to the secondary shoe 4, a backing plate 9 for supporting the constituent members, and anchor pins 11, 12 arranged to be projected from a cylinder body 60 for receiving an anchor reaction from the respective brake shoes 3 and 4.

Further, the drum, not illustrated, is concentric with the backing plate 9 and rotated in an arrow mark R direction when a vehicle is moved forward.

The anchor pins 11 and 12 are fixedly attached to the backing plate 9 along with the cylinder body 60.

The brake shoes 3 and 4 are attached to the backing plate 9 by shoe hold mechanisms 14 movably to the inner periphery of the drum. Further, end portions of the respective brake shoes 3 and 4 on a side of the wheel cylinder assembly 6 are connected to the respective anchor pins 11 and 12 by way of anchor springs 15 and 16 and urged in directions in which the end portions of the respective shoes are made to be proximate to each other (that is, directions of separating from the drum).

Further, the end portions of the respective brake shoes 3 and 4 on the side of the wheel cylinder assembly 6 are retrained from being floated up by a hold plate 25 hung between the pair of anchor pins 11 and 12.

Further, end portions of the respective brake shoes 3 and 4 on a side of the adjuster assembly 8 are urged to maintain a state of being brought into contact with end portions of the adjuster assembly 8 by an urge force of an adjuster spring 13.

The adjuster assembly 8 is inherently for adjusting an interval between the end portions of the brake shoes 3 and 4 in accordance with a progress of wear of linings 3c and 4c of the respective brake shoes 3 and 4 and is constituted to automatically adjust the interval between the end portions of the brake shoes 3 and 4 by an operation of pivoting an adjuster lever 17 a front end of which is brought into contact with an adjusting gear 8a on the adjuster assembly 8 by an urge force of the adjuster spring 13. The adjuster lever 17 is connected with an end portion of an adjuster cable assembly 19 by way of a cable guide 18 attached onto the secondary shoe 4 from the anchor pin 12.

The adjuster cable assembly 19 makes the adjuster lever 17 carry out a predetermined pivoting operation by operating a pivoting force to the adjuster lever 17 in accordance with a moving amount in expanding to open the secondary shoe 4.

Further, in the case of the drum apparatus 1 of the embodiment, a strut 21 and a parking lever 22 constituting a parking brake are also integrated onto the backing plate 9.

An end portion of the strut 21 on a side of the brake shoe 3 is urged by a spring 26 to maintain a state of being brought into contact with the brake shoe 3.

The parking lever 22 is pivotably connected to the brake shoe 4 by a parking lever pin 23 for enabling the brake shoes 3 and 4 to the drum face even by a pivoting operation of the parking lever 22.

Concisely explaining, the wheel cylinder assembly 6 is for expanding to open the pair of brake shoes 3 and 4 in braking by a pair of pistons 31 and 32 brought into contact with the respective brake shoes 3 and 4 and includes a control lever 37 for feeding back a control force in accordance with a control torque of the piston 32 on one side, and a control valve 39 for closing a fluid path 41 formed at inside of the cylinder body 60 when the control torque exceeds a reference by utilizing the control force of the control lever 37 to restrain a further increase in a brake force.

A constitution of the wheel cylinder assembly 6 will be described in details as follows.

As shown in FIG. 2, the wheel cylinder assembly 6 includes the cylinder body 60 including the primary piston 31 brought into contact with the primary shoe 3, the secondary piston 32 brought into contact with the secondary shoe 4, a cylinder portion 34 for primary for slidably holding the primary piston 31 and a cylinder portion 35 for secondary for slidably holding the secondary piston 32 and making the respective piston 31 and 32 slidable by a pressure of a hydraulic oil supplied to the respective cylinder portions 34 and 35, the control lever 37 one end portion 37a of which is pivotably squeezed between the secondary piston 32 and the secondary shoe 4 for feeding back a control force (a force in a direction of pushing back the piston 32) in accordance with a control torque to the secondary piston 32, and the control valve 39 for closing a fluid path formed at inside of the cylinder body 60 cooperatively moved with returning the secondary piston 32 by the control force to restrain a further increase in the control force.

In the case of the embodiment, according to the cylinder body 60, as shown by FIG. 2, one end side of a cylinder structure in a shape of a single straight pipe both ends of which are opened is made to constitute the cylinder portion 34 for primary and other end side thereof is made to constitute the cylinder portion 35 for secondary.

Further, a valve seat 43 having the fluid path 41 for communicating the two cylinder portions is arranged between the cylinder portions 34 and 35.

The valve seat 43 is restricted in a position thereof by a stop ring 47 fixed to a groove portion 45 at a cylinder inner periphery between the cylinder portions 34 and 35 so as not to be able to move further to a side of the primary piston 31.

Further, a spring (compression coil spring) 71 is mounted to between the valve seat 43 and the primary piston 31 for urging these in directions of being remote from each other. The spring 71 urges the primary piston 31 to a side of the primary shoe 3 to maintain in a state of being brought into contact with the primary shoe 3.

The control valve 39 is constituted by the valve seat 43 and a valve body 49 seated on the valve seat 43 by being moved cooperatively with returning the secondary piston 32 by the control force to close the fluid path 41. The valve body 49 is integrated to a recess portion 51 formed at the secondary piston 32.

Further, a spring (compression coil spring) 72 is mounted to between the valve body 49 at inside of the recess portion 51 and the valve seat 43 for urging these in directions of being remote from each other. The spring 72 urges the secondary piston 32 to the side of the secondary shoe 4 by way of the valve body 49 and a front end of the secondary piston 32 maintains a state of being brought into contact with the secondary shoe 4 by way of the one end portion 37a of the control lever 37.

Outer peripheries of the respective pistons 31 and 32 and the control valve 39 are mounted with seal cups 53 in a ring-like shape for sealing intervals between the outer peripheries and the cylinder inner periphery.

Further, end portions of the respective cylinder portions 34 and 35 are mounted with boots 55 engaged with the respectives of the cylinder portions 34 and 35 and the respective pistons 31 and 32 for preventing invasion of a foreign matter to inside of the cylinder body 60.

In the case of the embodiment, at other end portion 34b of the control lever 37 pivotably squeezed between the anchor pin 12 and an end portion of the secondary shoe 4 constituting the brake shoe on one side, a curved face portion 37d brought into contact with the anchor pin 12 is formed by a cylindrical curved face constituting a center of a curvature by a center O1 of the anchor pin 12, however, a curved face portion 37e brought into contact with the end portion of the brake shoe 4 is formed by a cylindrical curved face having a center of curvature O2 at a position of being remote from the center O1 of the anchor pin 12 by a predetermined distance S to a drum inner side such that a direction of a rotational moment M is not changed by a change in an operating direction of an operating force from the brake shoe 4 by the brake torque.

Further, in the case of the embodiment, according to the control lever 37, the respectives of the one end portion 37a and the other end portion 37b are fitted to the end portion of the secondary shoe 4 by recess and projection fitting. Therefore, even when the curved face portion 37d of the control lever 37 is separated from the anchor pin 12 by the press force by the secondary piston 32, the control lever 37 is not positionally shifted at the end portion of the secondary shoe 4.

According to the drum brake apparatus 1 mentioned above, for example, when a brake operation is started in running forward, a hydraulic pressure is supplied to an initial fluid chamber partitioned by the valve seat 43 at inside of the cylinder portion 35 for secondary and the secondary piston 32. Further, the hydraulic pressure supplied to the initial fluid chamber flows into a fluid chamber partitioned by the valve seat 43 at inside of the cylinder portion 34 for primary and the primary piston 31 by passing the fluid path 41 formed at the valve seat 43. Thereby, the primary piston 31 presses the primary shoe 3 in a direction of expanding to open the primary shoe 3 and the secondary piston 32 presses the secondary shoe 4 in a direction of expanding to open the secondary shoe 4 by way of the one end portion 37a of the control lever 37.

When the respective brake shoes 3 and 4 are pressed in the directions of expanding to open the brake shoes 3 and 4 to be brought into contact with the inner peripheral face of the drum, the respective brake shoes 3 and 4 are rotated to move to a side of the anchor pin 32 along with the drum, the end portion of the secondary shoe 4 on the side of the anchor pin 12 is brought into contact with the anchor pin 12 by way of the other end portion 37b of the control lever 37 to generate the brake force.

At this occasion, since the center of curvature of the curved face portion 37e of the other end portion 37b of the control lever 37 is set to be shifted to the position of being remote from the center of curvature of the anchor pin 12 by the predetermined distance S to the drum inner side, a portion of the brake torque operated to the anchor pin 12 from the secondary shoe 4 generates the rotational moment M of rotating the one end portion 37a of the control lever 37 in the clockwise direction of the drawing centering on the anchor pin 12. The rotational moment M operates a control force (return force) in a direction of weakening the press force from the one end portion 37a to the secondary piston 32.

The control force is increased in accordance with an increase in the control torque operated from the secondary shoe 4 to the anchor pin 12. Further, when the brake torque exceeds a reference magnification, the side of the control force becomes larger than the press force by the fluid pressure at inside of the cylinder operated to the secondary piston 32 to push back the secondary piston 32 against the fluid pressure at inside of the cylinder. By the returning operation of the secondary piston 32, the valve body 49 integrated to the recess portion 51 is moved to the side of the valve seat 43, the fluid path 41 of the valve seat 43 is closed to stop the hydraulic oil from flowing to the fluid chamber on the side of the cylinder portion 34 for primary to thereby restrain a further increase in the brake torque.

Therefore, a stable effect can be ensured by restricting the brake torque generated by the drum brake apparatus 1 to be equal to or smaller than the reference magnification.

Further, in a state in which the valve body 49 is seated on the valve seat 43 by the control force by the brake lever 37, when a brake pedal is further stepped on and the fluid pressure supplied to the initial fluid chamber between the valve seat 43 and the secondary piston 32 is further increased, the press force to the one end portion 37a by the secondary piston 32 becomes larger than the control force, the secondary piston 32 presses back the one end portion 37a to pivot the control lever 37 in the counterclockwise direction around the anchor pin 12. By moving the secondary piston 32, the valve body 42 is detached from the valve seat 43, the fluid path 41 is opened again, the increased fluid pressure is supplied to the fluid chamber on the side of the cylinder portion 34 for primary, the press forces of the respective brake shoes 3 and 4 to the drum inner peripheral face are further increased to thereby increase the brake force.

According to the drum brake apparatus 1 explained above, the both ends of the cylinder body 60 of the wheel cylinder assembly 6 having the cylinder structure of the shape of the single state pipe constitute the cylinder portions of containing the pair of pistons 31 and 32, in comparison with the case of the background art in which the exclusive cylinder portions are formed for the respective pistons by shifting an axial position, the cylinder body can be prevented from being large-sized owing to the shift of the axial position of the respective cylinder portions by simplifying the structure of the cylinder body 60. Further, a step of working the cylinder portion taking time and labor can be reduced.

Further, a middle portion of the cylinder structure in the shape of the single straight pipe is utilized as the fluid chamber of containing the control valve 39, and therefore, in comparison with the case of the background art in which the exclusive fluid chamber of containing the control valve 39 is formed separately from the cylinder portion, it is not necessary to work to form the liquid chamber exclusive for the control valve separately from the cylinder portion, also in this respect, the working step can be reduced by simplifying the structure of the cylinder body 60, at the same time, large-sized formation of the cylinder body 60 caused by installing the exclusive liquid chamber for the control valve in parallel with the cylinder portion can be resolved.

Therefore, according to the drum brake apparatus 1, small-sized formation or a reduction in work cost can be achieved by simplifying the structure of the cylinder body 60 of the wheel cylinder assembly 6 including the control lever 37 and the control valve 39 as means for stabilizing the brake force.

Further, according to the drum brake apparatus 1 mentioned above, the valve body 49 constituting the control valve 39 is integrated to the recess portion 51 formed at one of the pair of pistons 31 and 32, and therefore, in comparison with the case of not being integrated to inside of the piston, an increase in a length of the cylinder portion 35 for secondary can be restrained, large-sized formation of the cylinder body 60 for installing the valve body 49 is avoided and small-sized formation of the cylinder body 60 can be promoted.

Further, by integrating the valve body 49 to the recess portion 51 of the secondary piston 32, a diameter of winding and a set length of the spring 72 for urging the secondary piston 32 are made to be smaller than a diameter of winding and a set length of the spring 71 for urging the primary piston 31, the winding diameters and the set lengths of the two springs 71 and 72 can be made to be different from each other and erroneous integration can be prevented.

Further, there is constituted the structure in which the position of the valve seat 43 constituting the control valve 39 is restricted by the stop ring 47 locked to the groove portion 45 between the pair of cylinder portions 34 and 35, and therefore, the cylinder portion is worked for restricting the position of the valve seat 43 only by forming the groove portion 45, which contributes to a reduction in work cost.

Further, according to the drum brake apparatus 1, at the other end portion 37b of the control lever 37 pivotably squeezed between the anchor pin 12 and the end portion of the brake shoe 3 on one side, the curved face portion 37e of the control lever 37 brought into contact with the end portion of the brake shoe 4 is formed into a curved face having a center of curvature of O2 at a position of being remote from the center O1 of the anchor pin 12 by the predetermined distance S to the drum inner side, and therefore, even when the direction of operating the operating force in accordance with the brake torque from the brake shoe 4 is changed, the direction of the rotational moment is not changed, the brake lever 37 can always achieve a stabilized control force, and therefore, stabilization of the brake force in the duo-servo type drum brake apparatus 1 can be realized.

Further, in the case of the embodiment, according to the control lever, the respectives of the both end portions 37a and 37b are fitted to the end portion of the secondary shoe 4 by the recess and projection fitting. Therefore, even when the curved face portion 37d of the control lever 37 is detached from the anchor pin 12 by the press force by the secondary piston 32, the control lever 37 is not shifted in the position at the end portion of the secondary shoe 4.

Further, a specific structure of the wheel cylinder assembly used in the drum brake apparatus according to the invention is not limited to the mode of FIG. 2.

Figure 3:
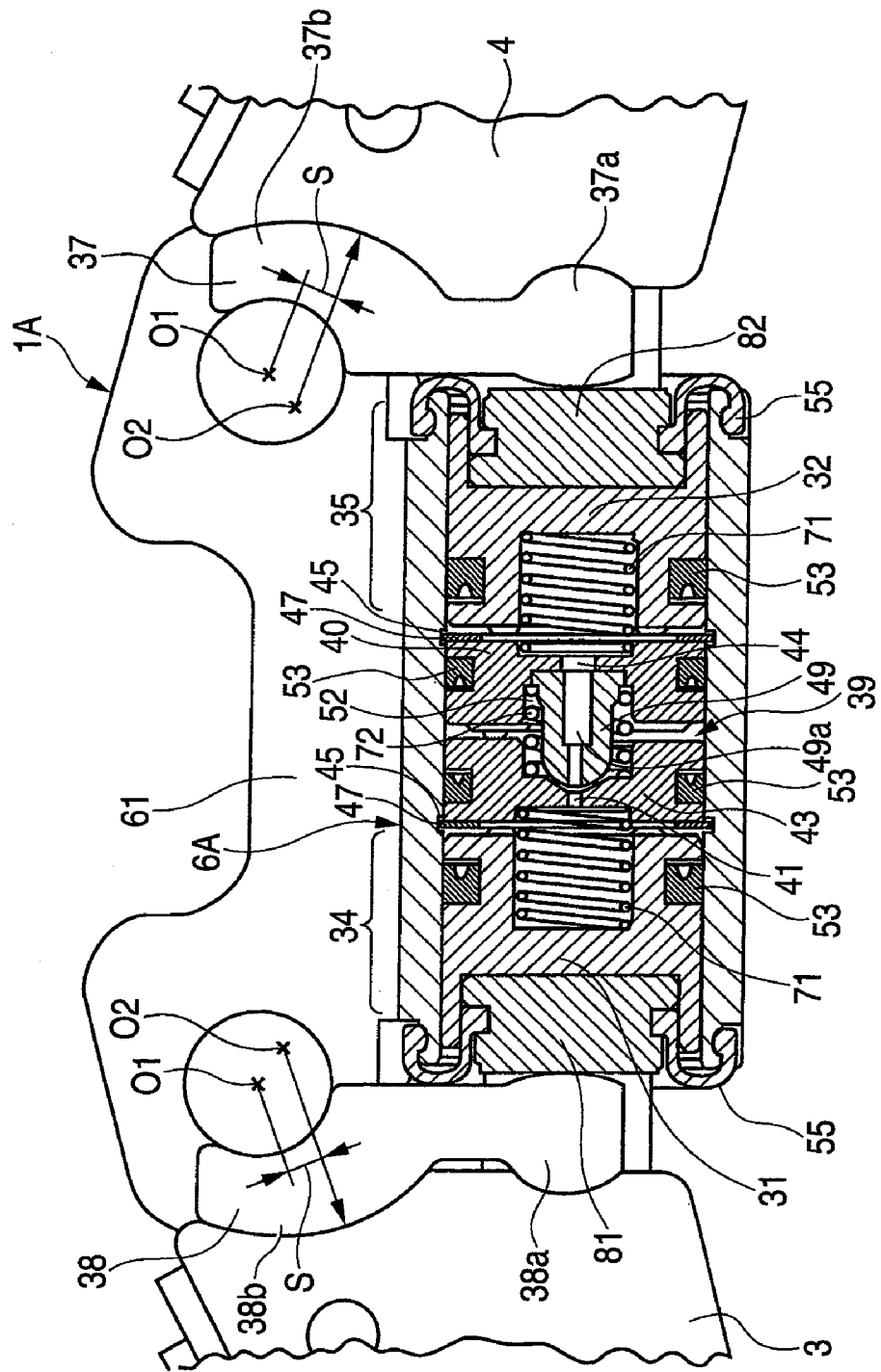
FIG. 3 is a vertical sectional view enlarging other embodiment (second exemplary embodiment) of a wheel cylinder used in the drum brake apparatus according to the invention.

FIG. 3 shows other embodiment (second exemplary embodiment) of a wheel cylinder assembly used in the drum brake apparatus according to the invention. Further, in FIG. 3, constitutions common to those of the wheel cylinder 6 shown in FIG. 2 are attached with the same numerals and an explanation thereof will be omitted.

A drum brake apparatus 1A according to the embodiment adopts a wheel cylinder assembly 6A improved to achieve a stabilized effect of braking not only in moving forward but also in moving rearward similar to that in moving forward.

According to the wheel cylinder assembly 6A; the pair of brake shoes 3 and 4 are expanded to open by the pair of pistons 31 and 32 in braking, it is common to the case of the embodiment shown in FIG. 2 that the one end portion of the cylinder structure in the shape of the single straight pipe formed at the cylinder body 61 constitutes the cylinder portion 34 for primary and the other end side constitutes the cylinder portion 35 for secondary. However, in the case of the embodiment, in order to stabilize an effect of braking in moving rearward, a control lever 38 is also provided between the primary piston 31 and the primary shoe 3.

The control lever 38 is constructed by a constitution similar to that of the control lever 37 provided between the secondary piston 32 and the secondary shoe 4 for stabilizing the effect of braking in moving forward.

Further, in accordance with providing the control lever 38 for moving rearward, the control valve 39 mounted to the cylinder inner periphery between the respective cylinder portions 34 and 35 for supporting the pair of pistons 31 and 32 is improved.

The control valve 39 in this case is arranged with a plug 40 having a similar structure opposed to the valve seat 43 penetrated to be formed with the fluid path 41 to the center. The valve body 49 including a through hole 49a communicated with a fluid path 44 of the plug 40 mentioned later at a center position is mounted to between the valve seat 43 and the plug 40.

The plug 40 is penetrated to form with a fluid path 44 for communicating with the cylinder portion 35 for secondary at a center thereof, and similar to the structure of restricting the position by the valve seat 43, by the stop ring 47 fixed to the groove portion 45 of the cylinder inner periphery, movement thereof to the side of the secondary piston 32 is restricted (position restriction). Further, the side of the valve seat 43 of the plug 40 is formed with a recess portion 52 for integrating the valve body 49. The valve body 49 is urged to the side of the stop ring 47 for restricting the position of the plug 40 by a spring 72 pressed to be mounted to between the valve seat 43 and the valve body 49 (that is, side of the secondary piston 32).

A spring 71 for urging the secondary piston 32 to the side of the secondary shoe 4 is pressed to be mounted to between the plug 40 and the secondary piston 32.

Further, in the case of the embodiment, front end portions of the respective pistons 31 and 32 are mounted with rods 81 and 82 brought into contact with one end portions 37a and 38a of the respective control levers 37 and 38.

A material different from that of the respective pistons 31 and 32 can be selected for the rods 81, 82, and therefore, by selecting a material suitable for sliding with the control levers 37 and 38 for the respective rods 81 and 82, a wear resistance can be promoted, or a reduction in cost can be achieved by restricting a portion of using an expensive material.

As shown by FIG. 3, by mounting the control levers 37 and 38 for the respectives of the side of the primary shoe 3 and the side of the secondary shoe 4, the effect of braking can be stabilized in braking in either of moving forward and moving rearward.

Figure 4:
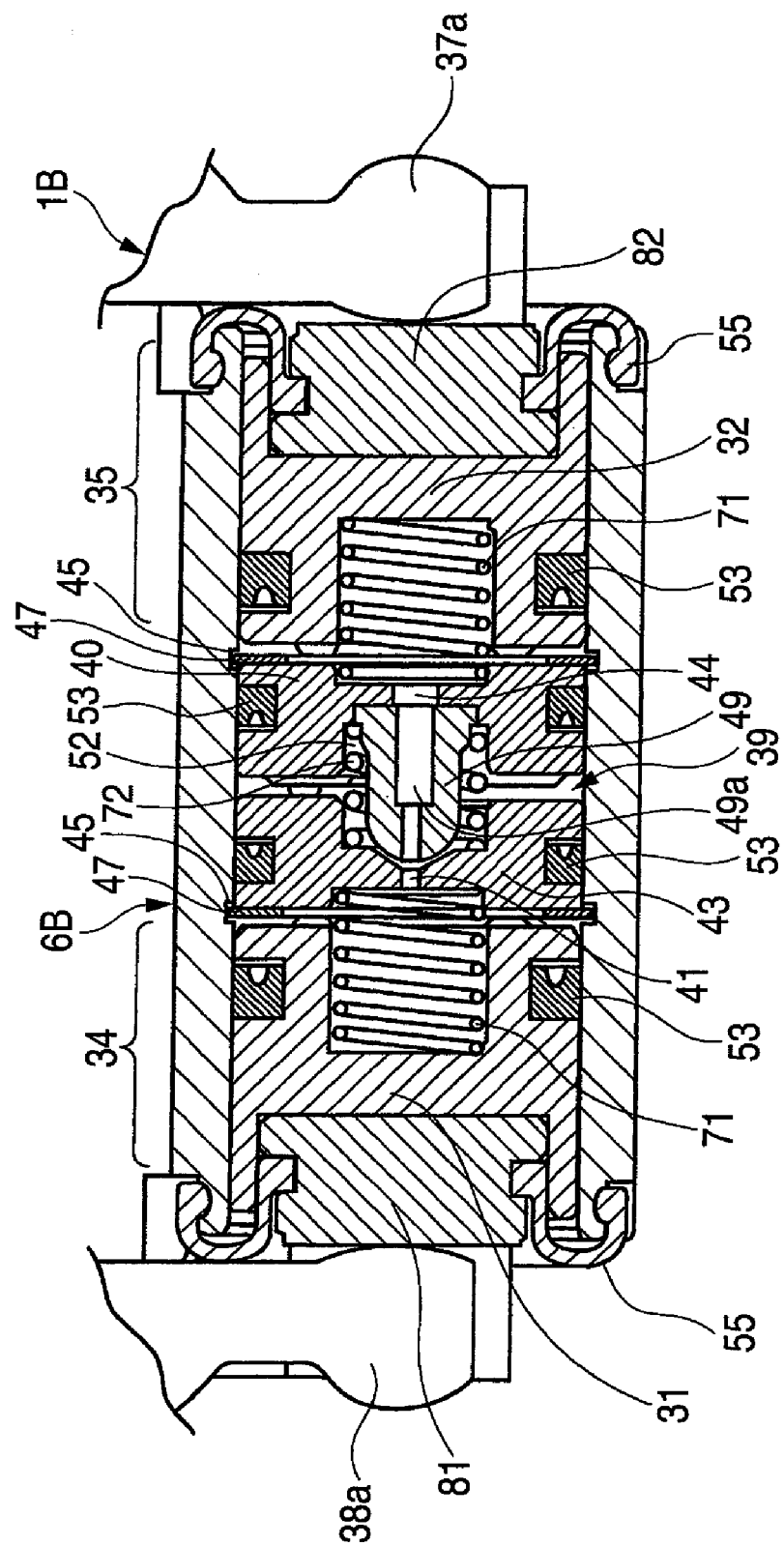
FIG. 4 is a vertical sectional view enlarging still other embodiment (third exemplary embodiment) of a wheel cylinder used in the drum brake apparatus according to the invention.

FIG. 4 shows still other embodiment (third exemplary embodiment) of a wheel cylinder assembly used in a drum brake apparatus 1B according to the invention. According to the wheel cylinder assembly 6B shown in FIG. 4, a portion of the wheel cylinder assembly 6A shown in FIG. 3 is improved, the valve body 49 is made of an elastic material, after the valve body 49 is seated on the valve seat 43 to close the fluid path 41 by making the valve seat 43 and the plug 41 moved cooperatively with returning the piston 31 or the piston 32 in braking proximate to each other, when the press force from the piston 31 or the piston 32 on one side is increased by increasing the brake torque, by elastically deforming the valve body 49 per se, further returning of the piston on one side is permitted.

The wheel cylinder assembly 6B shown in FIG. 4 is constructed by a constitution common to that of the wheel cylinder assembly 6A shown in FIG. 3 except that the valve body 49 is made of the elastic material, the same numerals are attached to constitutions common to those of the wheel cylinder assembly 6A and an explanation thereof will be omitted.

According to the wheel cylinder assembly 6B shown in FIG. 4, when the brake torque in braking reaches the reference magnification, the valve body 49 is seated on the valve seat 43, the hydraulic oil is stopped from flowing to the liquid chambers of the respective cylinder portions 34 and 35 to restrain a further increase in the brake torque.

Further, when a behavior for promoting the effect of the brake is further brought about under the state, by elastically deforming the valve body 49 per se, the returning of the piston increasing the press force is permitted, the effect of the brake is prevented from being increased, and therefore, actually, the drawback that the effect of the brake exceeds the reference magnification is not brought about and the effect of the brake more stabilized than the wheel cylinder assembly 6A shown in FIG. 3 can be ensured.

Further, a technology of making the valve body 49 by the elastic member is applicable also to the wheel cylinder assembly 6 shown in FIG. 2.

Figure 5:
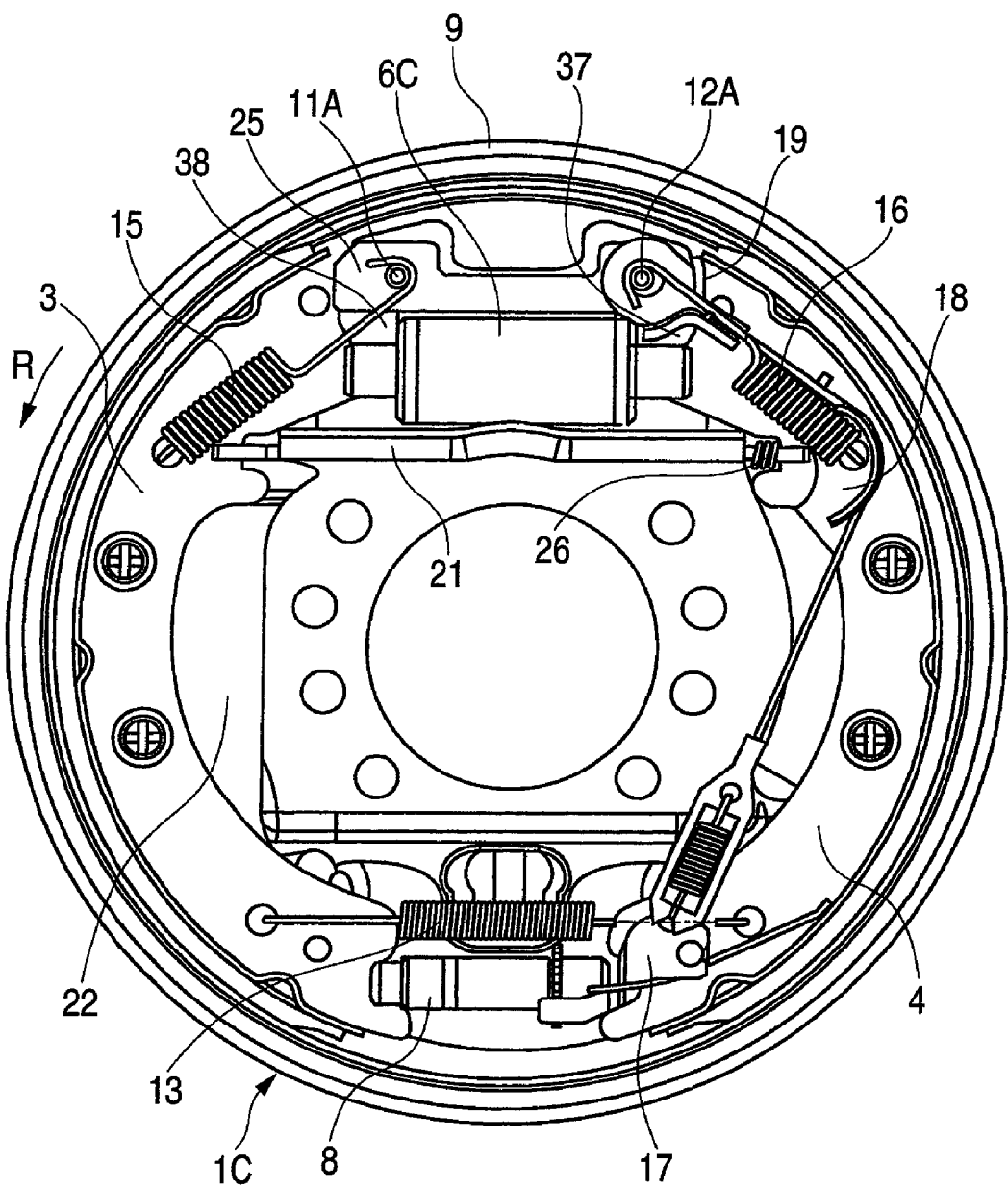
FIG. 5 is a front view of other embodiment (fourth exemplary embodiment) of the drum brake apparatus according to the invention.
Figure 6:
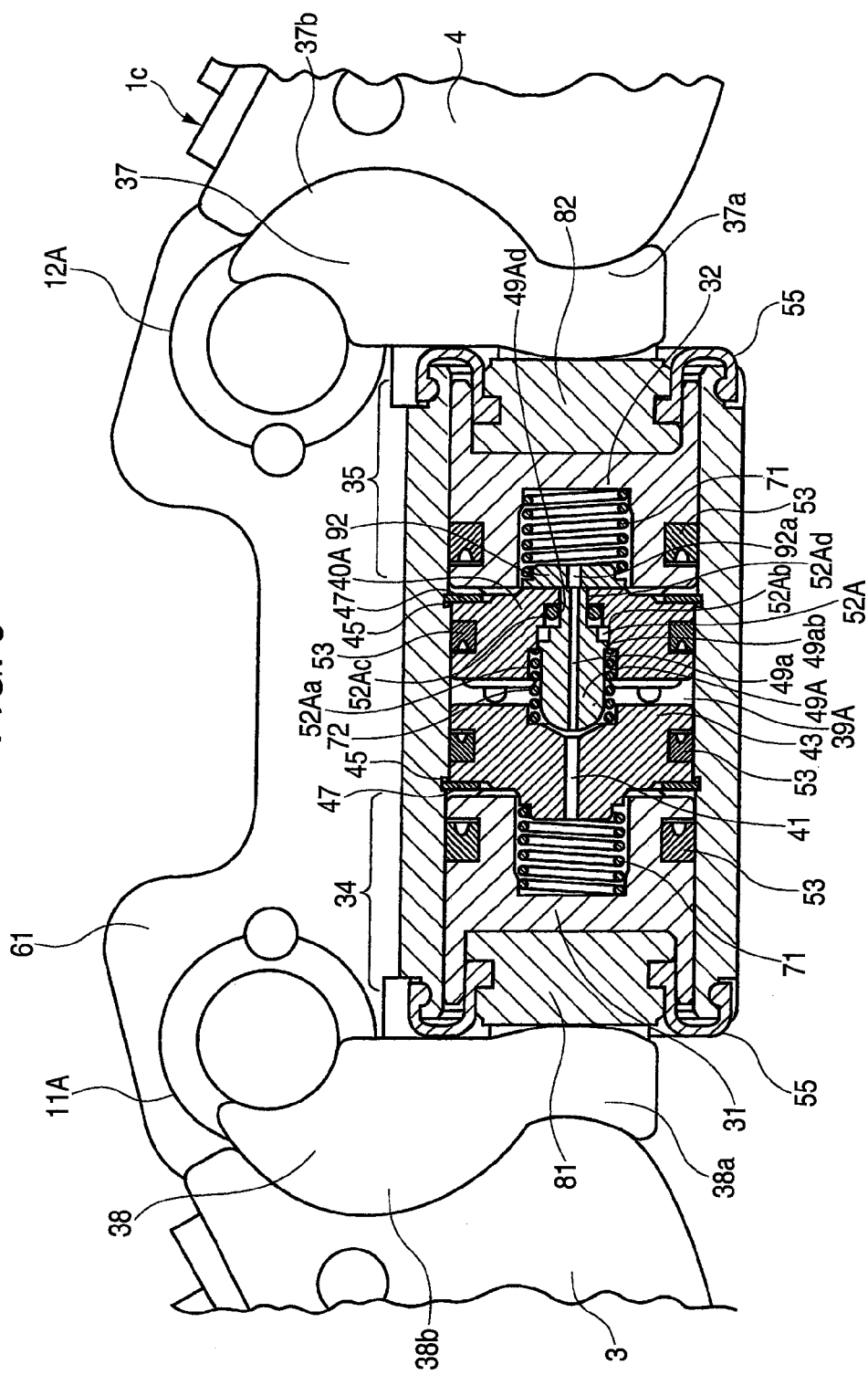
FIG. 6 is a vertical sectional view enlarging a wheel cylinder shown in FIG. 5.

FIG. 5 is a front view of other embodiment (fourth exemplary embodiment) of a drum brake apparatus according to the invention, and FIG. 6 is a vertical sectional view enlarging a wheel cylinder shown in FIG. 5.

In a so-to-speak duo-servo type drum brake apparatus shown in FIG. 5, a basic constitution including a pair of the primary shoe 3 and the secondary shoe 4 opposedly arranged in a space at inside of the drum, not illustrated, substantially in a cylindrical shape, a wheel cylinder assembly 6C arranged on one opposed end sides of the brake shoes 3 and 4 for pressing the respective brake shoes 3 and 4 to the drum face in braking, the adjuster assembly 8 arranged between other opposed ends of the respective brake shoes 3 and 4 and serving as a link function of inputting the output of the primary shoe 3 to the secondary shoe 4, the backing plate 9 for supporting the constituent members, anchor pins 11A and 12A arranged to be projected from a cylinder body 61 of the wheel cylinder assembly 6C for receiving anchor reaction force from the respective brake shoes 3 and 4 is common to that of the drum brake apparatus 1 shown in FIG. 1.

Further, the drum, not illustrated, is concentric with the backing plate 9 and is rotated in an arrow mark R direction of FIG. 5 in moving forward a vehicle.

The respective anchor pins 11A and 12A are fixedly attached to the backing plate 9 along with the cylinder body 61.

According to the wheel cylinder assembly 6C, a portion of the wheel cylinder assembly 6A shown in FIG. 3 is improved and a constitution other than an improved point is common to that of the wheel cylinder assembly 6A. The common constitution is attached with the same numeral and an explanation thereof will be omitted or simplified.

The improved point of the wheel cylinder assembly 6A will be described in details as follows.

According to the control valve 39A of the wheel cylinder assembly 6C, a point that a plug 40A having a similar structure is arranged to be opposed to the valve seat 43 penetrated to form with the fluid path 41 to the center, and a recess portion 52A for integrating the valve body 49A is formed at the plug 40A is common to that of the control valve 39 of the wheel cylinder assembly 6A.

However, as shown by FIG. 6, the recess portion 52A is provided in a mode of reducing an inner diameter at a plurality of stages toward the side of the secondary piston 32.

A first inner diameter portion 52Aa of the recess portion 52A having a maximum diameter is a portion of containing an end portion of the spring 72 arranged between the valve seat 43 and the plug 40A to make the valve seat 43 and the plug 40A remote from each other, and a stepped difference of a terminal end thereof constitutes a spring receive portion. Further, the spring 72 serves also as a valve holding spring for restricting the valve body 49 contained in the recess portion 52A from being displaced to the side of the valve seat 43 of the valve body 49.

A second inner diameter portion 52Ab of the recess portion 52A having a secondly large diameter contains a maximum diameter portion of the valve body 49A slidably in a direction of being opposed to the valve main seat 43.

Further, a third inner diameter portion 52Ac of the recess portion 52A having a thirdly large diameter contains a seal ring 91 for sealing an interval between the valve body 49A and the third inner diameter portion 52Ac in liquid tight.

Further, a fourth inner diameter portion 52Ad of the recess portion 52 having the smallest diameter is penetrated to the side of the secondary piston 32.

The valve body 49A is restricted from being displaced to the side of the valve seat 43 by bringing an end face on the side of the valve seat of a flange portion 49Ab having the maximum outer diameter fitted to the secondary inner diameter portion 52Ab into contact with an end portion on the side of the plug 40A of the valve holding spring 72.

According to the valve body 49A, an end face of a rear end small diameter portion 49Ad inserted through the fourth inner diameter portion 52Ad of the recess portion 52A is brought into contact with a valve seat 92 brought into contact with and arranged at the end portion of the plug 40A on the side of the secondary piston 32.

A side of the secondary piston 32 of a through hole 49a penetrated to be formed at a center portion of the valve body 49A is communicated with the liquid chamber of the cylinder portion 35 containing the secondary piston 32 by way of the through hole 92A penetrated to be formed at the valve seat 92.

Further, a side of the primary piston 31 of the through hole 49a is communicated with the liquid chamber of the cylinder portion 34 containing the primary piston 31 by way of the fluid path 41 penetrated to be formed at the valve seat 43.

The end portion of the spring 71 contained at the recess portion of the secondary piston 32 for urging the secondary piston 32 to the secondary shoe 4 is seated on the spring seat 92. The spring 71 presses the end portion of the valve body 49A brought into contact with the spring seat 92, and serves also as a return spring for operating an urge force in a direction of returning to an original state in which the flange portion 49Ab of the valve body 49A has been brought into contact with the spring 72 to the rear end small diameter portion 49Ad when the valve body 49A is displaced to the secondary piston 32 and the rear end small diameter portion 49Ad of the valve body 49A is projected from a rear face of the plug 40A.

As is apparent from the above-described explanation, according to the wheel cylinder assembly 6C shown in FIG. 6, the valve body 49A is held by the recess portion 52A of the plug 40 in liquid tight and sildably.

Further, the valve body 49A at inside of the recess portion 52A is elastically supported to be able to displace in a direction of being remote from the valve seat 43 at inside of the recess portion 52A by the valve holding spring 72 for restricting the displacement to the side of the valve seat 43 and the return spring 71 for urging the valve body 49A at inside of the recess portion 52A to be brought into contact with the valve holding spring 72.

According to the wheel cylinder assembly 6C shown in FIG. 6, when the brake torque in braking reaches the reference magnification, the valve body 49A is seated on the valve seat 43 to close the fluid path 41, the hydraulic oil is stopped from flowing to the liquid chambers of the respective cylinder portions 34 and 35 and a further increase in the brake torque is restrained.

Further, when the press force from the one piston (for example, the secondary piston 32) is increased by increasing the brake torque further, by displacing the valve body 49A to an inner depth side of the recess portion 52A against the urge force of the second spring 71, further returning of the one piston is permitted, the effect of braking is restrained from being increased, and therefore, actually, the drawback that the effect of the brake exceeds the reference magnification is not brought about, and the effect of the brake more stabilized than that of the wheel cylinder assembly 6A shown in FIG. 3 can be ensured.

Further, the wheel cylinder assembly 6C mentioned above is constructed by a constitution in which the spring 72 functions also as the valve holding spring of restricting the displacement to the side of the valve seat 43 of the valve body 49A contained at inside of the plug 40A by bringing the end portion of the spring 72 arranged between the valve seat 43 and the plug 40A into contact with also the valve body 49A to separate the valve seat 43 and the plug 40A from each other, in this way, by restricting the position of the valve body 49A by the spring 72, even when a structure per se of the valve seat 43 or the plug 40A is constituted by a simple structure as illustrated, the position of the valve body 49A can be restricted to be able to displace to a side reverse to the valve seat 43 and a simplification or promotion of an integrating performance of the structure of the valve seat 43 or the plug 40A can be achieved.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 1, 1A drum brake apparatus
1B, 1C drum brake apparatus
3 primary shoe (brake shoe)
4 secondary shoe (brake shoe)
6, 6A, 6B, 6C wheel cylinder assemblies
11, 12 anchor pins
11A, 12A anchor pins
31 primary piston (piston)
32 secondary piston (piston)
34 cylinder portion for primary (second cylinder portion)
35 cylinder portion for secondary (first cylinder portion)
37, 38 control levers
39 control valve
39A control valve
40 plug
40A plug
41, 44 fluid paths
43 valve seat
47 stop ring
49, 49A valve main bodies
49a through hole
49Ab flange portion
49Ad rear end small diameter portion 52A recess portion
52Aa first inner diameter portion
52Ab second inner diameter portion
52Ac third inner diameter portion
52Ad fourth inner diameter portion
71 spring (return spring)
72 spring (valve holding spring)
91 seal ring
92 spring seat
92a through hole

What is claimed is:

1. A drum brake apparatus comprising:
a wheel cylinder assembly configured to expand a pair of brake shoes, the wheel cylinder assembly comprising:
   a cylinder body;
   a pair of pistons brought into contact with the respective brake shoes to expand the brake shoes;
   a control lever configured to feed back a control force to one of the pistons in accordance with a brake torque; and
   a control valve configured to restrain an increase of the brake torque by closing a fluid path formed inside of the cylinder body when the brake torque exceeds a reference torque,
wherein the cylinder body includes a structure defining a single straight pipe both ends of which are open, the cylinder body including a first cylinder portion for one of the pistons on one end of the cylinder body and a second cylinder portion for the other of the pistons on the other end of the cylinder body,
wherein a valve seat of the control valve includes the fluid path and is arranged between the first cylinder portion and the second cylinder portion,
wherein the control valve includes a plug opposing the valve seat;
wherein the valve seat and the plug are respectively restrained in position by stop rings fixed to groove portions of an inner periphery of the cylinder body; and
wherein a valve body is configured to seat on the valve seat by cooperatively moving with a returning movement of the one of the pistons so as to close the fluid path in the valve seat, the valve body including a through hole communicated with a fluid path of the plug and being mounted in a recess portion formed in the plug.

2. The drum brake apparatus according to claim 1, wherein the valve body is made of an elastic material, and
the valve body is elastically deformable when a piston force is increased by increasing the brake torque after the valve body seats on the valve seat by cooperatively moving with a returning movement of the one of the pistons to close the fluid path.

3. The drum brake apparatus according to claim 1, wherein the valve body is slidably held in the recess portion of the plug in a liquid tight manner; and
wherein the valve body in the recess portion is elastically supported so as to be displaced in a direction away from the valve seat by a valve holding spring restricting the valve body from being displaced toward the valve seat and a return spring urging the valve body into contact with the valve holding spring.

4. The drum brake apparatus according to claim 3, wherein an end of a spring arranged between the valve seat and the plug to make the valve seat and the plug remote from each other is also brought into contact with the valve body, and
the spring functions as the valve holding spring of restricting the valve body from being displaced toward the valve seat.

5. The drum brake apparatus according to claim 1, wherein, at an end portion of the control lever pivotably disposed between an anchor pin and an end portion of one of the brake shoes, a curved face portion brought into contact with the end portion of the one of the brake shoes includes a curved face having a center of curvature at a position offset from a center of the anchor pin by a predetermined distance to a drum inner side.

* * * * *